(12) United States Patent
Riley et al.

(10) Patent No.: US 12,277,244 B2
(45) Date of Patent: *Apr. 15, 2025

(54) DATA AGGREGATION SYSTEM FOR ENABLING QUERY OPERATIONS ON RESTRICTED DATA THAT ORIGINATES FROM MULTIPLE INDEPENDENT MULTIPLE SOURCES

(71) Applicant: Neustar, Inc., Reston, VA (US)

(72) Inventors: Xavier Riley, Reston, VA (US); Alan Burye, Reston, VA (US)

(73) Assignee: NEUSTAR, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,681

(22) Filed: Dec. 12, 2023

(65) Prior Publication Data

US 2024/0193293 A1 Jun. 13, 2024

Related U.S. Application Data

(63) Continuation of application No. 17/352,699, filed on Jun. 21, 2021, now Pat. No. 11,841,963, which is a continuation of application No. 16/442,899, filed on Jun. 17, 2019, now Pat. No. 11,042,662, which is a continuation of application No. 14/986,407, filed on Dec. 31, 2015, now Pat. No. 10,339,330.

(51) Int. Cl.
*H04L 29/06* (2006.01)
*G06F 16/245* (2019.01)
*G06F 16/2458* (2019.01)
*G06F 21/60* (2013.01)
*G06F 21/62* (2013.01)

(52) U.S. Cl.
CPC ........ *G06F 21/6218* (2013.01); *G06F 16/245* (2019.01); *G06F 16/2471* (2019.01); *G06F 21/604* (2013.01); *G06F 21/6227* (2013.01)

(58) Field of Classification Search
CPC ............. G06F 21/6218; G06F 16/2471; G06F 16/245; G06F 21/604; G06F 21/6227
See application file for complete search history.

(56) References Cited

U.S. PATENT DOCUMENTS

| | | | |
|---|---|---|---|
| 10,339,330 B2 | 7/2019 | Riley et al. | |
| 10,572,478 B2 * | 2/2020 | Chen | G06F 16/2471 |
| 11,042,662 B2 | 6/2021 | Riley et al. | |
| 11,841,963 B2 | 12/2023 | Riley et al. | |
| 2002/0065802 A1 * | 5/2002 | Uchiyama | G06F 16/9538 |
| 2004/0230636 A1 * | 11/2004 | Masuoka | G06F 9/451 708/800 |
| 2012/0036442 A1 * | 2/2012 | Dare | G06F 8/60 715/736 |
| 2013/0291059 A1 * | 10/2013 | Giambiagi | H04L 63/20 726/1 |
| 2017/0193244 A1 | 7/2017 | Riley et al. | |

* cited by examiner

*Primary Examiner* — Evans Desrosiers
(74) *Attorney, Agent, or Firm* — Sterne, Kessler, Goldstein & Fox P.L.L.C.

(57) ABSTRACT

Examples described herein relate to a data aggregation system for enabling query operations on restricted data that originates from multiple independent sources.

20 Claims, 4 Drawing Sheets

DATA AGGREGATION SYSTEM FOR ENABLING QUERY OPERATIONS ON RESTRICTED DATA THAT ORIGINATES FROM MULTIPLE INDEPENDENT MULTIPLE SOURCES

RELATED APPLICATIONS

This application is a Continuation of U.S. patent application Ser. No. 17/352,699, filed Jun. 21, 2021, which is a Continuation of U.S. patent application Ser. No. 16/442,899, filed Jun. 17, 2019, which is a Continuation of U.S. patent application Ser. No. 14/986,407, filed Dec. 31, 2015; the aforementioned priority applications being hereby incorporated by reference in their entireties for all purposes.

TECHNICAL FIELD

Examples described herein relate to a data aggregation system for enabling query operations on restricted data that originates from multiple independent sources.

BACKGROUND

Data aggregation refers to technologies which aggregate and analyze data from multiple sources. Increasingly, data migration applications utilize larger volumes of data, for more sophisticated analysis. These applications can often require significant computational resources, many times using processors that are dedicated or optimized for "big data" analytics. In this technological realm, refinements in algorithms and processes can translate directly to benefits such as reduction in use of hardware resources (e.g., processors, cache and memory, etc.).

Entity resolution is an example of a data aggregation application. Entity resolution refers to data analysis and processes which identify manifestations of real-world entities for a variety of purposes. Entity resolution has been the subject of many technological improvements, ranging from algorithmic considerations to optimization of data management. In regards to people, entity manifestation becomes a much more complicated task, because such applications can introduce numerous problems relating to people's right to privacy, as well as restrictions as to how such information can be shared.

DETAILED DESCRIPTION

Examples described herein relate to a data aggregation system for enabling query operations on restricted data that originates from multiple independent sources.

Among other purposes, examples as described enable implementation of "big data" applications, including entity resolution applications which aggregate information for numerous entities from multiple independent sources. Among other benefits, examples provide for a data aggregation system that includes functionality for complying with source-specific usage rules that often accompany entity related data, thus enabling a greater number of data sources to supply information. The functionality for enabling enforcement of data usage rules can be implemented in a manner that optimizes a collection of records for search operations by third-parties, while at the same time controlling use of the data being queries so that compliance with source-specific usage rules are met. With the assurance of compliance, a larger data set can be aggregated and provided for search. Additionally, the optimization implemented for search ensures the querying entity can more efficiently receive a complete and credible response to a query, thereby reducing the load on the computational resources that provide the data aggregation system.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines. Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. As used herein, the term "memory" includes individual memory components and/or memory media, as well as an aggregate of memory media and components which are available for use by a computer or computer system. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

Figure 1:
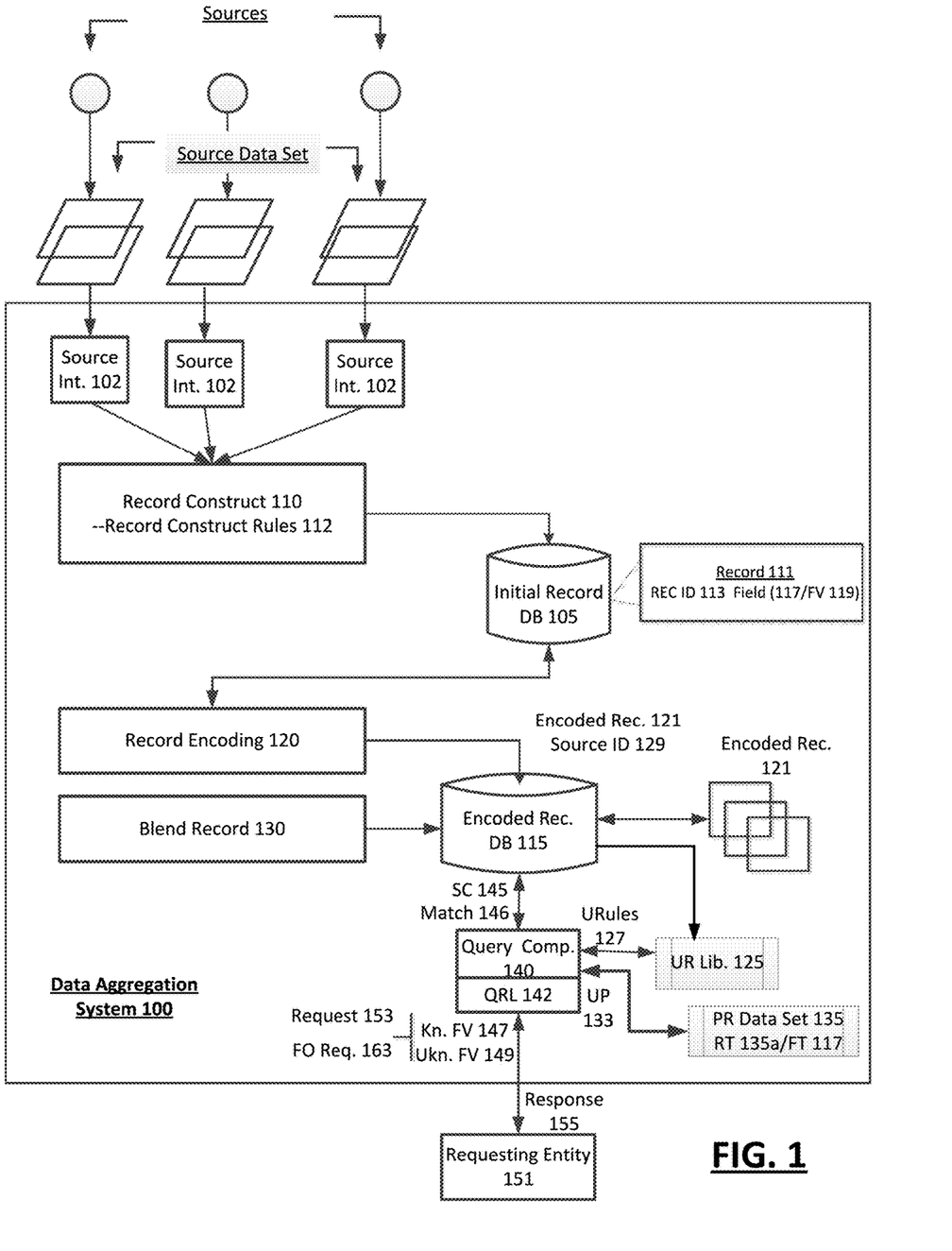
FIG. 1 illustrates a data aggregation system for enabling query operations on restricted data that originates from multiple independent sources, according to one or more embodiments.

FIG. 1 illustrates a system for enabling query operations on restricted data that originates from multiple independent sources, according to one or more embodiments. A system such as described with an example of FIG. 1 can be implemented in a variety of computing environments, including, for example, as a network service that connects with multiple independent data sources over a network such as the Internet. Accordingly, an example of FIG. 1 can be implemented on a server, or combination of servers that can interface with independently operated computing entities that manage data sources, as well as computing entities and/or users which can communicate with the system 100 over a query interface.

In an example of FIG. 1, data aggregation system 100 includes one or multiple source interfaces 102, a record construction component 110, a record encoding component 120, a blending component 130 and a query component 140. The components of data aggregation system 100 are illustrative of functionality, which can be implemented through processes, logical entities, and/or hardware components such as shown with an example of FIG. 1. Accordingly, functionality such as shown with components of data aggregation system 100 can be implemented in a distributed or virtual environment, through a server or combination of servers, or in alternative computing environments such as provided through one or more interconnected workstations.

With further reference to an example of FIG. 1, each source interface 102 can be adapted to communicate and/or receive sets of source data 95 from a corresponding data source 10. Collectively, the source interfaces 102 can receive multiple sets of source data 95 from different sources 10. The data aggregation system 100 can aggregate data from the sources 10 either continuously or periodically (e.g., monthly). In one implementation, the data aggregation system 100 receives sets of source data 95 for purpose of maintaining a fresh database for use with a query service.

As described in greater detail, the data sets 95 can include restricted information, such as, for example, personal identifiable information of individuals or similar identifiers for other entities. In such context, the term "restricted" or variants thereof is intended to mean data which is subject to one or more rules or conditions which control when and how such data can be used by the data aggregation system 100. In many examples, data sets 95 are restricted as to when and how such data can be revealed to requesting entities in the form of a query response. The rules or conditions which restrict data sets 95 can include contractual rules, such as between source 10 and an entity or administrator of the data aggregation system 100. As an addition or alternative, the rules or conditions which restrict data sets 95 can include contractual provisions (e.g., terms of service, or "TOS") as between the sources 10 and individuals who are part of a customer or user base of a service provided by that source. Still further, in some examples, the rules or conditions which restricted data sets 95 can include laws, regulations, network policies, and/or best practices. Collectively, the rules and conditions which are specific or selective to individual sources are termed "usage rules 127".

The record construction component 110 can structure individual records 111 from the data sets 95. In one implementation, the record construction component 110 generates a data structure that includes an identifier 113 and a specific set of field types 117 that are organized or otherwise arranged in accordance with one or more templates. In the context of an entity resolution implementation, each record can represent an entity, and the fields 117 of each record can represent, for example, a name, address, residence city, residence state, social security number, social network identifier, email address and various other types of information (as may be noted by other examples described herein). The identifier 113 can be specific to the record 111 or to the entity represented by the record. For each record 111, one or more of the field types 117 can be assigned to field values, and many records 111 may not include field values 119 for each and every field type 117. The sufficiency of a given record as to content can be determined by implementation preference, with minimal sufficiency being met when, for example, one or multiple field values 119 are known for a given entity represented by the particular record 111.

The record construction component 110 may utilize a set of record construction rules 112 in forming records 111 from the data sets 95. Among other examples, the record construction rules 112 can specify one field value 119 for each field, or alternatively, one field value 119 for each field type 117 of a particular kind or category. In an example in which records represent individual people, with field values that correspond to various identifiers of individuals, the fields can structure the individual records 111 to include one or more of a last name or surname, a Social Security number, a home address, work address, a phone number, an email address, social network identifier, maiden name, gender, race etc.

In one implementation, the data aggregation system 100 implements a record build phase through execution of the record construction component 110. In the record build phase, the record construction component 110 generates records 111 from the data sets 95 of source 10, without regard to duplicity of information from different sources 10. A set of initial records can be stored as an initial or temporary record database 105, pending further structuring and analysis.

According to one example, the record encoding component 120 implements a series of operations on the records 111 of the initial record database 105, in order to modify the individual records 111 into encoded records 121. The encoded records 121 can be provided in an encoded record database 115. The record encoding component 120 can, for example, perform operations for encoding field values (e.g., "last names"), or components of field values (e.g., street name in address), in order to optimize the management of the records for a particular objective, such as reducing search time for query submissions. According to one example, the field values, or alphanumeric components of field values, may be encoded using a numerical transformation or substitution, so that the contents of the encoded records 121 include, for example, encoded (e.g., numerical) references to alphanumeric data items (e.g., names, or portions of names for addresses, etc.) that comprise the corresponding field value 119. The record encoding component 120 can also encode a source identifier 129 for each source of field value 119. The source identifier 129 may be specific to individual fields, so that each field value 119 of a given record of the initial record database 105 that is not blank or a null value can include or otherwise be associated with the source identifier 129 when provided in the encoded record database 115, with the source identifier 129 identifying the specific source 10 which supplied the data for the particular field value. In some examples, the encoded record 121 can be structured similarly to record 111, but without encoded representations of field values, and further with inclusion of the source identifier 129.

The blending component 130 can implement operations to combine the records that are generated from the data sets 95. In an example shown by FIG. 1, the blending component 130 implements operations to combine encoded records 121 so as to form a reduced set of records. In variations, the blending component 130 can implement the operations on the records 111 of the initial record database 105. In either implementation, the blending component 130 can identify when records from different sources 10 pertain to a common entity, and merge the records for the common entity, so that the resulting record 121 includes field values from each of the identified different sources (unless otherwise restricted by usage rules).

The blending component 130 can combine records 121 in accordance with blending rules 131 and/or usage rules of sources 10. The blending rules 131 can refer to rules that are not specific to a source or usage. By way of example, a blending rule 131 can provide that if two records appear to pertain to a same entity, but include alternative field values for at least one type of field (e.g., phone number), then the records are not combined. Alternatively, the blending rule 131 can provide that if two records appear to pertain to the same entity, but include alternative field values for at least one type of field (e.g., phone number), then separate records are maintained for the entity to account for each of the alternative field values, with each of the separately maintained records including field values from both records.

The blending component 130 can also selectively blend records 121 based on usage rules 127. Specifically, some usage rules 127 may provide that information for a given person or entity cannot be replicated onto another record, or alternatively appended with information from other sources other than the specific entity. In such cases, a separate record may be maintained for field values that originate from a specific source that has usage rules against replicating or appending the field values.

According to some examples, if two records appear to pertain to the same entity and include no alternative field values, then the records can be combined by (i) when one of the two records has a particular field value, then including the field value in the combined record along with the source identifier of the source 10, and (ii) when both of the records has the particular field value, then including the field value in the combined record, with a source identifier for each source 10 that provided the information of the record. A similar process as illustrated by the example can be extended to combine three or more records from different sources 10. With respect examples described, the record 121 from the encoded record database 115 can include some field values which have one associated source identifier, while other field values can have multiple source identifiers associated with it.

In some examples, the sources 10 can be ranked based on authoritativeness or credibility. The higher rankings for authoritativeness or credibility can reflect a likelihood that the information provided from the source is accurate and up to date. The set of usage rules 127 provided from each source can be stored as a usage rule library 125, such as in the form of a database or collection of data stores. In some examples, the sources 10 can be categorized in accordance with tiers, indicating the restrictiveness of usage rules that exist with data provided from each source. The source identifiers 129 provided with individual field values of each record 121 can link or otherwise reference one or more of (i) a set of relevant usage rules that originate from the source 10 designated by the source identifier 129, regarding the field value provided by that source; and/or (ii) metadata, instructions and/or other abstraction of the set of relevant usage rules of the source 10, indicating the manner in which the field value provided by the particular source can be used.

In furtherance of an example of FIG. 1, the encoded record database 115 can be searchable for criteria as provided through the query component 140. The query component 140 can receive input different kinds, including queries for specific field values that match to an input, as well as queries to augment a given record with field values that are deemed unknown ("unknown field values 149"). An unknown field value can include field values which are null or blank in a given record, field values which are individually requested from a search or query, and/or field values which are not known as accurate or up to date. Some sources (e.g., most restrictive provider) can mandate usage rules which preclude appending a field value originating from the particular source to an existing record which may contain information from other sources. In some examples, the query component 140 receives a request 153 from a requesting computer entity 151. The request 153 can specify one or more known field values 147. Additionally, the request 153 can specifically request, or generally indicate a request for one or more unknown field values 149. As an example, the request 153 can include a partially complete or outdated record for an entity, in which case the request 153 is to append an outdated or unknown set of field values, as indicated by the existing record.

Various usage rules may govern how information from records may be returned in response to the request 153. By way of example, highly restricted records can preclude information from the record being appended to other records. In such cases, the records created from such sources can be exclusive in containing information a single source, but alternative records may exist for a given entity if information about the entity can be obtained from other sources. As an addition or variation, usage rules for highly restricted data may limit the response 155 that can be supplied to a request 153. In particular, the response may be limited to binary "yes" or "no" type responses which can verify information of a requesting entity 151. In contrast, restricted records may reflect field values which are blended, and may also permit disclosure of field values in the responses 155.

In one implementation, the query input of request 153 is translated or converted into an encoded format of the encoded record database 115. The query component 140 uses least one known field value 147 of the request 153 as a search criterion 145 in order to determine a matching record 146. The query component 140 uses the matching record to determine field values that correspond to the unknown field values 149. Each of one or more source identifier 129 associated with the determined field values are used to determine the corresponding set of usage rules from the usage rule data store 125. As described in prior examples, while some field values may have one source identifier 129, if multiple sources 10 provide information for obtaining the same field value of a particular record for a given entity, then the source identifier for each of the multiple sources is maintained in association with the particular field value 119 and the record 121. In this way, the source identifiers associated with the individual records 111, 121 and/or their respective field values 119 can maintain the lineage as to the respective source of information. The query component 140 determines the relevant set of rules for each source identifier that is to be provided as part of a response 155 to the query input 141. The query component 140 can generate the response 155 to the requesting for entity 151 to be in accordance (e.g., compliance) with a relevant set of rules.

According to some examples, the query component 140 can include resolution logic 142 in order to provide the response 155 in a manner that meets objectives of providing the most complete set of field values (e.g., when a record is to be completed), using a most credible source of information, without violating usage rules of source providers. In this regard, the query resolution logic 142 can be implemented to optimize the response 155 based on objectives of completeness and credibility. By "optimize" the query resolution logic makes elections that are intelligent rather than random, regarding the choice of source and/or the manner for providing the response 155 to best meet the objectives. Examples recognize that the objectives in providing the response 155 can be competing objectives. The resolution logic 142 implements processes to optimize the response 155 so that, for example, the number of unknown field values for a given entity is minimized, subject to obtaining the greatest credibility by attributing field values to the highest rank source associated with a particular field value. Specific examples in which query component 140 generates responses 155 in accordance with objective(s) are provided with FIG. 2 and FIG. 3.

With reference to an example of FIG. 1, the library of usage rules 125 can provide a reference to the usage rules 127 of each source 10, and further identify usage values or parameters which may control the inclusion or use of a field value in the response 155. In one implementation, the query component 140 uses the source identifier of the selected source in order to determine the relevant set of usage rules 127. In some variation, the library 125 can implement usage rules 127 parametrically, meaning specific parameters may be utilized to identify when a given restriction is present. The library 125 can thus be implemented as a parametric data set 135, in which rule parameters 135a may be referenced against field type 117 (of the unknown parameter 147), type of request 153 and/or other considerations. The query resolution logic 142 may reference rule selection criteria against the parametric rule data set 135 in order to obtain usage parameters 133 for each source 10. The usage parameter 133 may dictate the operation that the query component 140 is to implement in returning the response 155 under the usage rules of the particular source. For example, the usage parameter 133 may specify any restriction or control over what would be included in the response 155 should the usage rules of the particular source be selected.

The rule selection criteria may include (i) the source identifiers 129 which are associated with the unknown field value 149, and (ii) the field type 117 of the unknown field value 149. The query resolution logic 142 can also include other selection parameters in obtaining usage parameters 133 for each source 10 of the unknown parameter 149, such as the type of the request 153, as well as the type of requesting entity, and other information about the requesting entity (e.g., time of last request, whether the record was previously provided to the requesting entity, etc.). The query component 140 may compare the usage parameters 133 in selecting the relevant set of usage rules 127.

When multiple sources are linked to providing a particular field value of the matching record 146, a process for selection can be implemented by the query resolution logic 142, which includes: (i) using the usage rule 127 of the source that is most credible or authoritative, based on the usage parameter 133, unless implementation of the usage parameter 133 would be too restrictive to permit inclusion of the unknown parameter 149 in the response 155, or would otherwise be restrictive to thwart the first primary objective. If implementation of the usage parameter would be too restrictive, then query resolution logic 142 may make the same determination for the usage rules of the next most authoritative or credible source 10 for the unknown field value 149. If each of the sources 10 which provide the particular field value are equally restrictive, then select the usage rule based on the most credible or authoritative source 10.

In variations, other selection processes can be employed, such as quantifying the restriction provided from the usage parameter 133 for each source, and then using the source which is least restrictive. The particular selection process can be varied, so long as the usage rules for one of the sources 10 which provided the unknown field value 149 are followed.

Methodology

Figure 2:
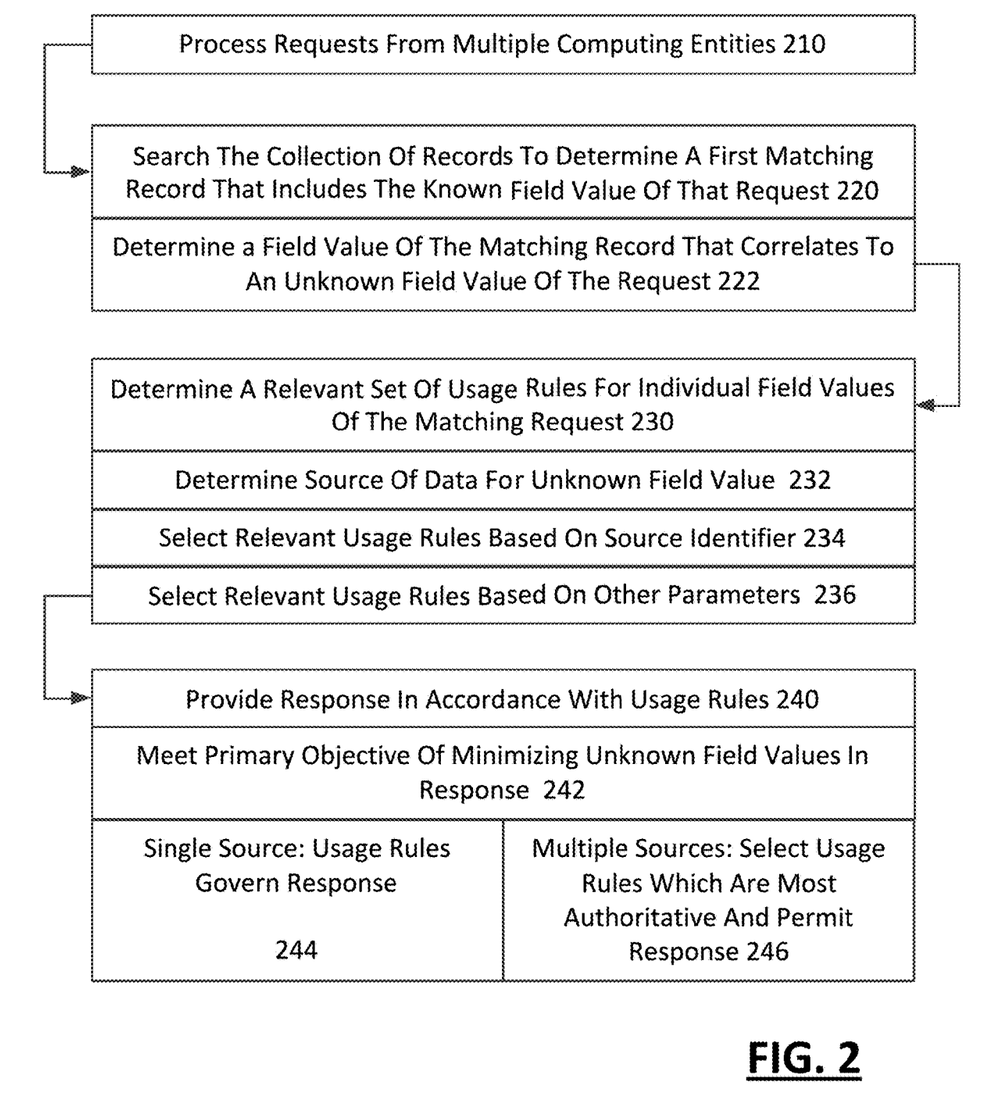
FIG. 2 illustrates an example method for implementing a data aggregation system at run-time, according to one or more embodiments.
Figure 3:
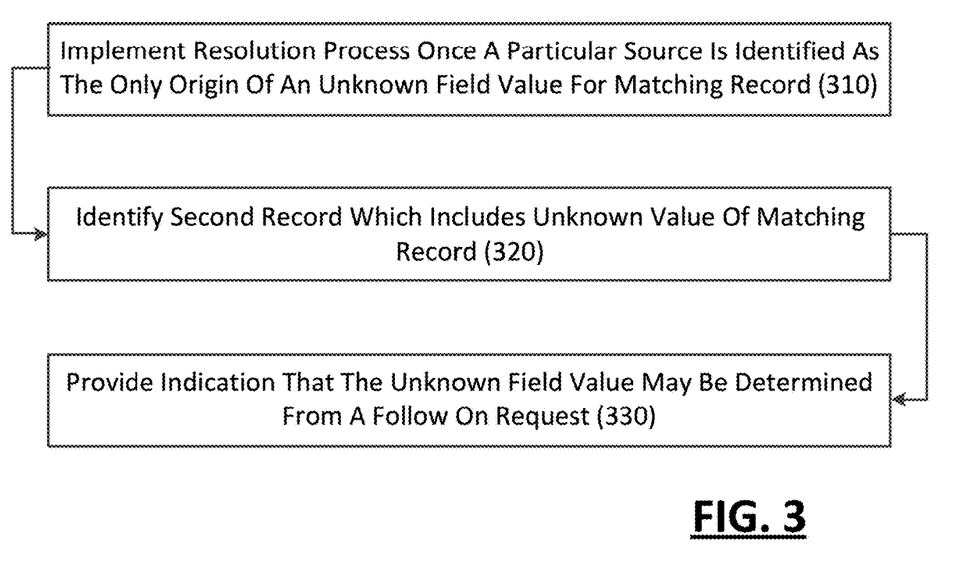
FIG. 3 illustrates an example method for implementing a data aggregation system at run-time to output alterations for an input query, according to one or more embodiments.

FIG. 2 illustrates an example method for implementing a data aggregation system at run-time, according to one or more embodiments. FIG. 3 illustrates an example method for implementing a data aggregation system at run-time to specify an alteration to an input query, according to one or more embodiments. Examples such as described with FIG. 2 and FIG. 3 may be implemented using a data aggregation system such as described with an example of FIG. 1. Accordingly, reference may be made to elements of FIG. 1 for purpose of illustrating suitable components or elements for performing a step or sub-step being described.

At run-time, instances of query component 140 can receive requests 153 from one or multiple computing entities 151 (210). For example, multiple terminals may connect to the data aggregation system 100 over the Internet, where each terminal is operated by an entity that has an existing relationship with an operator of the data aggregation system 100. In one implementation, each entity 151 corresponds to a terminal or server process that is operated or controlled by a customer in order to access the data aggregation system 100 using a secure portal. Accordingly, terminals or processes of the customer may undergo an authentication step (not shown), and the data aggregation system 100 may identify the requesting entity 151 before processing requests 153 on behalf of that entity. Each of the requests 153 from the requesting entities can specify a search criterion, which can correspond to a known field value 147 or set of known field values for a subject entity. By way of example, the known field value 147 can specify data items that are personal identifiable information about an individual, such as phone number, email address, residence, social security number, full legal name, etc.

The requests 153 can specifically or generally request one or more unknown field values 149 that are associated with the known field 147. For example, one type of request 153 can request a specific set of unknown field values 149 (e.g., "What is phone number for John Smith in Dayton Ohio?"). Another type of request 153 can be implemented through a programmatic interface which supplies a series of records which are outdated or partially complete. In such cases, a programmatic process can submit a series of records for update. As noted in some examples, the query component 140 can distinguish between types of request 153, as usage rules may require restrictions on some responses 155, such as when the response is to append an existing record of the requesting entity 151.

The query component 140 can search the collection of records to determine one or more matching records 146 that includes the known field value 147 of that request 153 (220). In an example of FIG. 1, the query component 140 implements the search on the encoded record database 115, which may be optimized for search operations (e.g., speed in returning matching record 146). For example, the request 153 can specify the known field value 147 of a phone number, and the query component may search records of the encoded record database 115 for a record with the same phone number. Alternatively, the request 153 can specify the known parameter of a full name along with an address or residence city. Once the matching record is identified, the query component 140 can determine a field value that correlates to at least one of the unknown field values (222). For example, once the matching record 146 is identified, the query component 140 can identify various field values in the response 155, such as phone number, email address, social network identifier, current residence address etc.

According to some examples, before the response 155 is returned to the requesting entity 151, the query component 140 identifies a process to determine a relevant set of usage rules 127 for individual field values of the matching record 146 that correlate to the unknown field values 149 (230). As mentioned with an example of FIG. 1, the matching record 146 may be blended to include field values determined from multiple sources 10, and at least some of the sources 10 may have differing usage rules. The query component 140 may identify which of the multiple sources 10 was a source of data for each field value of the matching record 146 which correlates to one of the unknown field values 149 that is to be included in the response 155 (232). In some examples, the query component 140 selects the relevant set of usage rules 127 based on the source identifier 129 for each unknown field value 149 (234). Additionally, in some variations, the query component 140 may also select the relevant set of usage rules based on other parameters, such as the type of query input 153 (236). By way of example, some usage rules may preclude inclusion of a field value in the response 155 when the corresponding request 153 appends data to an existing record of a customer. Thus, the query component 140 may incorporate the type of requests 153 as a selection parameter when selecting the relevant set of usage rules 127 from the usage library 125.

Once the relevant set of rules are selected, the query component 140 can provide the response 155 for the request 153 that is in accordance with the determined one or more usage rules (240). In doing so, the query component 140 can also provide the response 155 to meet a first primary objective of providing the most complete set of field values (e.g., when a record is to be completed) (242). Stated another way, the first primary objective may be to minimize a number of unknown field values 149 that are present in the response 155 for a particular request 153. Additionally, the query component 140 may also implement a second primary objective of obtaining most credible or authoritative source of information, without violating any usage rules of source providers.

In cases where there is only one source for unknown field values 149 to communicate in the response 155, the set of usage rules for that field value will govern the response 155 (244). Moreover, the usage rules of the single source may dictate that the response 155 discloses no information about the unknown field value 149 (e.g., such as when the usage rules preclude a particular field value to be returned in a query response to append a data record).

In cases where there are multiple sources for a field value, the query component 140 may select the source based on the first primary objective of minimizing unknown field values in the response 155, and a second additional primary objective of selecting the source with the most credibility or authoritativeness (246). The relevant usage rules may then be identified from the selected source.

With reference to an example of FIG. 3, a resolution process may be implemented once a particular source is identified as the only origin of an unknown field value 149 for the matching record 146 of request 153 (310). For example, a resolution process may be implemented upon completion of (242) in FIG. 2. In some examples, the resolution process may be implemented (e.g., by query component 140, using resolution logic 142) when a set of relevant usage rules of the source precludes inclusion of the unknown field value 149 in the response 155 to the first given request 153.

According to one example, the query component 140 identifies a second record in the collection which includes the same unknown value 149 but not the known field value 147 of the request 153 (320). In some examples, implementation of the blending component 130 can be affected by data usage rules of certain sources. For example, a source may include a usage rule that specifies when records constructed from data sets 95 of that source can be blended or otherwise combined. If usage rules preclude the blending component 130 from combining records of one source with data values of another source, the blending component 130 can maintain separate records for field values that originate from each source. As a result, one individual or entity may include multiple records, with one record originating from a particular source and incorporating a data usage restriction precluding field values from that record from being shared. The response 155 from the query component 140 may, for example, provide a binary output (e.g., information of the request 153 is "correct" or "not "correct"), but exclude any field values from being included in the response.

In some examples, the query component 140 can provide the response to include an indication that the unknown field value 149 can be determined from a follow on request which identifies a different known field value (e.g., different search criteria) (330). For example, the request 153 may specify known field values of an entity name (e.g., first name, last name) and phone number. The matching record 146 may contain the phone number, but have restrictions which preclude, for example, any data from the record being returned in the response 155. In such an example, the response 155 may include a "yes" or "no" answer that indicates the submitted information of the request 153 is correct or incorrect. If the response is that the field value is incorrect, the designation of "incorrect" may or may not specify the particular field value that is not correct, depending on the usage rules of the particular source. In some cases, when the information is correct, the response 153 may specify a communication such as "the information of this record is correct, but to obtain more information, specify other search criteria." Alternatively, the response may identify what search criteria should be specified in a follow on request.

In some examples, the query component 140 can identify field values of the alternative record (originating from a different source) which the requesting entity can specify in a follow on request 163. For example, the response 155 may include a message that indicates (i) the information of the first request 153 was correct, (ii) additional information that may have been requested (i.e., unknown field values) is not permitted to be returned based on the known parameters specified in the request 153, and (iii) at least some of the unknown field values 149 can be determined if the request 153 was to specify alternative field values (e.g., email address). The indication can be in the form of, for example, a message, notification, or pre-formulated query, either for human or machine consumption. For example, the message may include syntax for a follow on command, where fields of the matching record 146 are identified by syntax.

Computer System

Figure 4:
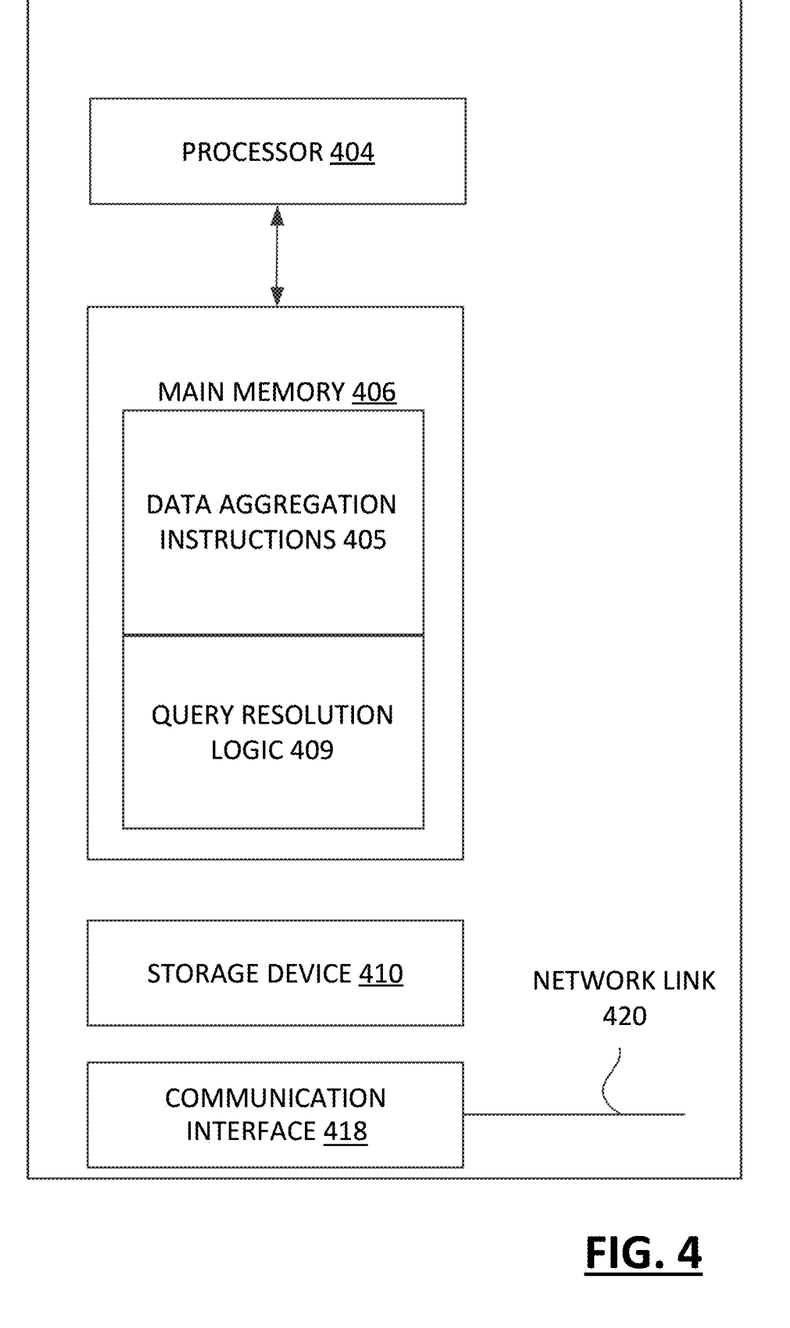
FIG. 4 is a block diagram that illustrates a computer system upon which a data aggregation system can be implemented in accordance with one or more embodiments.

FIG. 4 is a block diagram that illustrates a computer system upon which a data aggregation system can be implemented in accordance with one or more embodiments.

In an embodiment, computer system 400 includes processor 404, memory 406 (including non-transitory memory), storage device 410, and communication interface 418. Computer system 400 includes at least one processor 404 for processing information. Computer system 400 also includes the main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. The storage device 410, such as a magnetic disk or optical disk, is provided for storing information and instructions. The communication interface 418 may enable the computer system 400 to communicate with other servers or computer entities through use of the network link 420.

Examples described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative aspects, hard-wired circuitry may be used in place of or in combination with software instructions to implement aspects described herein. Thus, aspects described are not limited to any specific combination of hardware circuitry and software.

In some examples, the memory 406 can include instructions ("data aggregation system instructions 405" for implementing a data aggregation system 100 such as shown with an example of FIG. 1. The processor 404 may execute the data aggregation system instructions 405 in order to build a database of blended records which track lineage of the source for information contained in the records. For example, the data aggregation system instructions 405 can be executed to create the encoded database of records 115, from which, for example, records can be searched. The data aggregation system instructions 405 can also execute to enable querying by users or computers. The data aggregation system instructions 405 can include query resolution logic 409, which when executed, can enable a search process to select field values and records which are in accordance with usage rules and objectives of (i) maximizing quantity of information returned, and (ii) providing information that has the most credibility or authoritativeness.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A data aggregation system comprising:
    a memory to store:
        a set of run time instructions;
        a collection of records, wherein each record in the collection of records comprises one or more fields having a corresponding field value, wherein each field value has a corresponding source identifier for a source of the field value; and
        a library of data usage rules including a set of data usage rules for each source of a plurality of sources; and
    one or more processors that execute instructions from the set of run time instructions to:
        process requests from multiple computing entities, each request being for one or more unknown field values that are associated with a known field value specified in that request; and
        for each request,
            determine a first matching record that includes the known field value of the request;
            determine one or more data usage rules from the library of data usage rules that pertain to a source from the plurality of sources that provided an unknown field value specified by the request, wherein the one or more data usage rules govern how information from the source is returned in response to the request; and
            provide a response to the request in accordance with the data usage rules for the source.

2. The data aggregation system of claim 1, wherein a first record of the collection of records includes at least one field value including a source identifier corresponding to a first source of the plurality of sources, and wherein a second record of the collection of records includes at least one field value including a source identifier corresponding to a second source of the plurality of sources.

3. The data aggregation system of claim 1, wherein each record in the collection of records is encoded using a numerical transformation or substitution.

4. The data aggregation system of claim 1, wherein the known field value specified in the request comprises personal identifiable information about an individual.

5. The data aggregation system of claim 4, wherein the personal identifiable information comprises a phone number, email address, residence, social security number, or legal name of the individual.

6. The data aggregation system of claim 1, wherein the one or more data usage rules limit the response to a binary response.

7. The data aggregation system of claim 1, wherein the one or more data usage rules preclude appending a field value originating from the source to an existing record containing information from other sources.

8. The data aggregation system of claim 1, wherein the unknown field value for a first request includes multiple source identifiers corresponding to multiple sources.

9. The data aggregation system of claim 8, wherein to determine the one or more data usage rules, the one or more processors execute instructions to determine one or more data usage rules that pertain to each source of the multiple sources.

10. The data aggregation system of claim 9, wherein the one ore more processors further execute instructions to select a source based at least in part on a first objective of minimizing unknown field values in the response, and wherein providing the response comprises providing the response in accordance with the one or more data usage rules for the selected source.

11. A computer-implemented method for implementing a data aggregation system, the method comprising:
  processing, by the data aggregation system, requests from multiple computing entities, each request being for one or more unknown field values that are associated with a known field value specified in that request; and
  for each request,
    searching, by the data aggregation system, a collection of records to determine a first matching record that includes the known field value of that request, wherein each record in the collection of records comprises one or more fields having a corresponding field value, wherein each field value includes a source identifier for a source of the field value;
    determining, by the data aggregation system, one or more data usage rules that pertain to a source that provided an unknown field value specified by the request, wherein the one or more data usage rules govern how information from the source is returned in response to the request; and
    providing, by the data aggregation system, a response to the request in accordance with the data usage rules for the source.

12. The method of claim 11, wherein the one or more data usage rules are stored in a library of data usage rules including a set of data usage rules for each source of a plurality of sources.

13. The method of claim 12, wherein a first record of the collection of records includes at least one field value including a source identifier corresponding to a first source of the plurality of sources, and wherein a second record of the collection of records includes at least one field value including a source identifier corresponding to a second source of the plurality of sources.

14. The method of claim 11, wherein each record in the collection of records is encoded using a numerical transformation or substitution.

15. The method of claim 11, wherein the known field value specified in the request comprises personal identifiable information about an individual.

16. The method of claim 15, wherein the personal identifiable information comprises a phone number, email address, residence, social security number, or legal name of the individual.

17. A tangible, non-transitory computer-readable media storing computer-readable instructions that, when executed by one or more processors, cause the one or more processors to perform operations, the operations comprising:
  processing requests from multiple computing entities, each request being for one or more unknown field values that are associated with a known field value specified in that request; and
  for each request,
    searching a collection of records to determine a first matching record that includes the known field value of that request, wherein each record in the collection of records comprises one or more fields having a corresponding field value, wherein each field value includes a source identifier for a source of the field value;
    determining one or more data usage rules that pertain to a source that provided an unknown field value specified by the request, wherein the one or more data usage rules govern how information from the source is returned in response to the request; and
    providing a response to the request in accordance with the data usage rules for the source.

18. The tangible, non-transitory computer-readable media of claim 17, wherein the one or more data usage rules limit the response to a binary response.

19. The tangible, non-transitory computer-readable media of claim 17, wherein the one or more data usage rules preclude appending a field value originating from the source to an existing record containing information from other sources.

20. The tangible, non-transitory computer-readable media of claim 17, wherein the unknown field value for a first request includes multiple source identifiers corresponding to multiple sources.

* * * * *